US012155806B2

(12) United States Patent
Yamasaki

(10) Patent No.: US 12,155,806 B2
(45) Date of Patent: Nov. 26, 2024

(54) PRINTING APPARATUS, PRINTING APPARATUS CONTROLLING METHOD, AND STORAGE MEDIUM

(71) Applicant: CASIO COMPUTER CO., LTD., Tokyo (JP)

(72) Inventor: Shuichi Yamasaki, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 269 days.

(21) Appl. No.: 17/914,120

(22) PCT Filed: Mar. 12, 2021

(86) PCT No.: PCT/JP2021/009979
§ 371 (c)(1),
(2) Date: Jan. 30, 2023

(87) PCT Pub. No.: WO2021/193130
PCT Pub. Date: Sep. 30, 2021

(65) Prior Publication Data
US 2023/0188663 A1 Jun. 15, 2023

(30) Foreign Application Priority Data
Mar. 25, 2020 (JP) .................... 2020-053482

(51) Int. Cl.
B41J 2/045 (2006.01)
A45D 29/00 (2006.01)
(Continued)

(52) U.S. Cl.
CPC ............ H04N 1/387 (2013.01); A45D 29/00 (2013.01); B41J 2/04536 (2013.01); B41J 3/407 (2013.01);
(Continued)

(58) Field of Classification Search
CPC .... B41J 2/04536; B41J 2/04586; B41J 3/407; B41J 11/008; A45D 29/00;
(Continued)

(56) References Cited

U.S. PATENT DOCUMENTS 6,286,517 B1 * 9/2001 Weber ................... A45D 29/00
132/73
8,840,206 B2 9/2014 Hashimoto
(Continued)

FOREIGN PATENT DOCUMENTS

JP 2012055467 A 3/2012
JP 2013034748 A 2/2013
(Continued)

OTHER PUBLICATIONS

International Preliminary Report on Patentability (IPRP) (and English language translation thereof) dated Sep. 22, 2022, issued in International Application No. PCT/JP2021/009979.
International Search Report (ISR) (and English language translation thereof) dated May 25, 2021, issued in International Application No. PCT/JP2021/009979.
(Continued)

Primary Examiner — Anh T Vo
(74) Attorney, Agent, or Firm — Holtz, Holtz & Volek PC

(57) ABSTRACT

A printing apparatus includes a hardware processor and a printer. The hardware processor is configured to set a temporary base coat region which is a region where a base coat is to be applied, set a temporary design region which is a base design region and which includes an outer shape corresponding to a bounding polygon of the temporary base coat region, detect a base coat region of a nail where the base coat is applied, and adjust the temporary design region so that an outer shape of the temporary design region matches the outer shape of a bounding polygon of the base coat region, set a portion of the adjusted temporary design region overlapping with the base coat region as a design region, and (Continued)

generate design printing data. The printer prints a design on the nail based on the design printing data.

8 Claims, 8 Drawing Sheets

(51) Int. Cl.
*B41J 3/407* (2006.01)
*B41J 11/00* (2006.01)
*H04N 1/00* (2006.01)
*H04N 1/387* (2006.01)
*H04N 1/54* (2006.01)

(52) U.S. Cl.
CPC ........ *B41J 11/008* (2013.01); *H04N 1/00708* (2013.01); *H04N 1/54* (2013.01)

(58) Field of Classification Search
CPC ....... A45D 2029/002; A45D 2029/005; H04N 1/00708; H04N 1/387; H04N 1/4092; H04N 1/54
See application file for complete search history.

(56) References Cited

U.S. PATENT DOCUMENTS

| | | |
|---|---|---|
| 10,780,711 B2 | 9/2020 | Yamasaki |
| 2013/0038647 A1* | 2/2013 | Hashimoto .............. B41J 29/02 347/2 |
| 2014/0060560 A1* | 3/2014 | Bitoh ....................... B41J 3/407 132/73 |

FOREIGN PATENT DOCUMENTS

| | | |
|---|---|---|
| JP | 2017154502 A | 9/2017 |
| JP | 2018153525 A | 10/2018 |

OTHER PUBLICATIONS

Written Opinion dated May 25, 2021, issued in International Application No. PCT/JP2021/009979.
Chinese Office Action (and an English language translation thereof) dated Mar. 12, 2024, issued in counterpart Chinese Application No. 202180017394.
Japanese Office Action (and an English language translation thereof) dated Mar. 12, 2024, issued in counterpart Japanese Application No. 2020-053482.

* cited by examiner

| | FRENCH DESIGN F | FRENCH SHAPE DATA K | DESIGN DATA D |
|---|---|---|---|
| 1 |  |  |  |
| 2 |  |  |  |
| 3 |  |  |  |
| ⋮ | ⋮ | ⋮ | ⋮ |

//

PRINTING APPARATUS, PRINTING APPARATUS CONTROLLING METHOD, AND STORAGE MEDIUM

TECHNICAL FIELD

The present invention relates to a printing apparatus, a control method of a printing apparatus, and a control program.

BACKGROUND ART

Conventionally, a printing apparatus that prints a design on a nail of a finger of a human is known (see, for example, Patent Document 1).

In such type of printing apparatus, when French nails in which a printed region and a non-printed region are mixed are printed, base coat paint such as white is printed in the printed region and then color printing (design printing) is performed on top of the base coat.

CITATION LIST

Patent Literature

Patent Document 1: JP 2012-55467 A

SUMMARY OF INVENTION

Technical Problem

However, between the base coat printing and the design printing, the nail may be moved in occasions such as when the finger is pulled out from and inserted in the apparatus in order to dry the white ink and to apply a receptive layer for color ink. Therefore, there may be misalignment between a base coat region and a design region. As a result, there is a possibility that printing quality decreases due to the base coat going outside the nail. Although it is possible to match the base coat region with the design region by image processing, computational costs become high. Therefore, this is not desirable.

The present invention is conceived in view of the above situation and a purpose of the present invention is to suppress decrease in printing quality.

Solution to Problem

According to one aspect of the present disclosure, a printing apparatus includes a hardware processor configured to: set a temporary base coat region which is a region where a base coat is to be applied, set a temporary design region which is a base design region and which includes an outer shape corresponding to a bounding polygon of the temporary base coat region, detect a base coat region of a nail where the base coat is applied, adjust the temporary design region so that an outer shape of the temporary design region matches an outer shape of a bounding polygon of the base coat region, set a portion of the adjusted temporary design region overlapping with the base coat region as a design region, and generate design printing data; and a printer that prints a design on the nail based on the design printing data.

Advantageous Effects of Invention

According to the present invention, it is possible to suppress decrease in printing quality.

DESCRIPTION OF EMBODIMENTS

With reference to FIG. 1 to FIG. 6, an embodiment of the printing apparatus according to the present invention is described.

Although various technically preferable limitations in order to implement the present invention are added to the embodiments below, the scope of the present invention is not limited to the embodiments described below and the illustrated examples.

According to the embodiments described below, the printing apparatus is a nail print apparatus that prints a design on a fingernail of a hand as a target of printing. However, the target on which printing is performed by the printing apparatus according to the present invention is not limited to the fingernail of the hand, and a toenail of a foot may be the target of printing. Alternatively, an object other than nails such as a nail tip or a surface of various accessories may be the target of printing.

Figure 1:
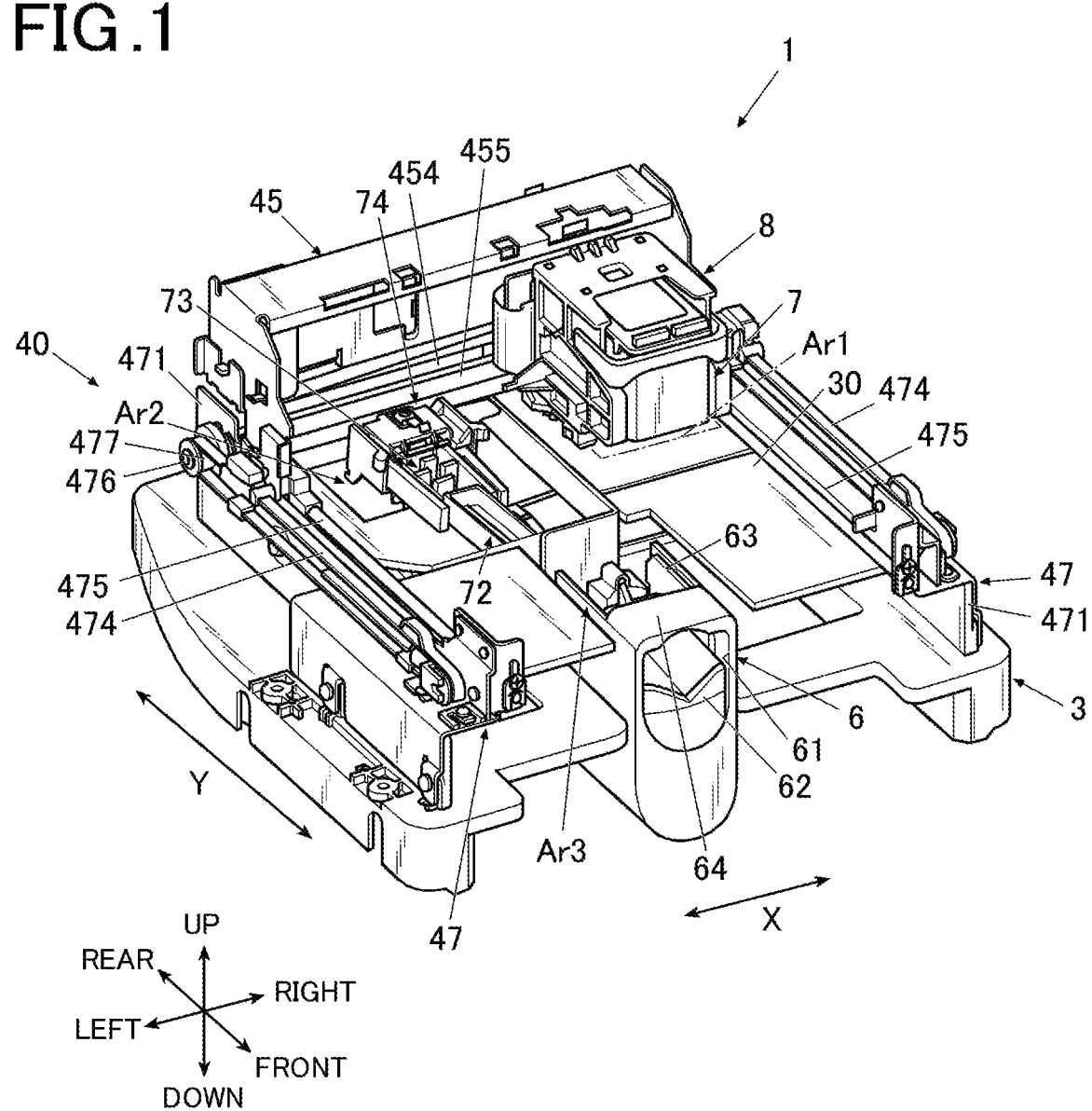
FIG. 1 is a perspective view of a main portion showing an internal component of a nail print apparatus according to the present embodiment.

FIG. 1 is a perspective view of a main portion showing an internal component of a nail print apparatus 1.

In the embodiments below, up-down, left-right, and front-rear are directions as shown in FIG. 1. Further, X-direction is a left-right direction, and Y-direction is a front-rear direction.

As shown in FIG. 1, the nail print apparatus 1 includes a base 3 in which various internal structures are included.

A substantially flat base upper plate 30 is provided on an upper side of the base 3. The base upper plate 30 is provided in a height so that it is even with a surface of a nail when a printed finger is fixed to a later-described finger fixer 6 (printing target surface).

A finger fixer 6 is provided in a front side (close side) portion of the base upper plate 30 and substantially the center in the left-right direction. The finger fixer 6 is a box-shaped member including an opening 61 that is open to a front side of the apparatus. The finger that is the printing target (printed finger) is inserted in the apparatus from the opening 61, and printing is performed on the nail of the printed finger.

A finger fixing member 62 that fixes the printed finger is provided in the finger fixer 6. The finger fixing member 62 presses up and supports the printed finger from the bottom side, and is formed from flexible resin, for example.

An open window 63 is provided in a top surface on a far side (rear side) of the finger fixer 6. The nail of the finger inserted in the finger fixer 6 is exposed from the window 63.

A close side (front side) of the top surface of the finger fixer 6 is to be a finger presser 64 that prevents the printed finger from rising and regulates a position of the printed finger in the upper direction. The printed finger is supported by the finger fixing member 62 from the lower side and the upper side of the printed finger is pressed by the finger presser 64. Therefore, the position of the surface of the nail of the printed finger (printing target surface) in the height direction is positioned in a predetermined position suitable for performing printing by a printer 40.

A printer 40 that performs printing on a printing target surface is provided inside the apparatus. Here, the printing target surface is a surface of the printing target, and is the surface of the fingernail in the present embodiment.

The printer 40 includes a cartridge 7 that includes a function as a print head, a cartridge holder 8 that supports the cartridge 7, an X-direction moving stage 45 and an X-direction moving motor 46 (see FIG. 2) that moves the cartridge 7 in the X-direction along the left-right direction, a Y-direction moving stage 47 and a Y-direction moving motor 48 (see FIG. 2) that moves the cartridge 7 in the Y-direction along the front-rear direction, and the like.

The Y-direction moving stage 47 includes a supporter 471 that is provided on each of both sides of the base upper plate 30 in the left-right direction. Each supporter 471 extends in the front-rear direction (Y-direction).

A pulley 477 is provided in each of both ends of the pair of supporters 471 in the extending direction. A driving belt 474 is wound around the pulley 477 on the left side and the right side of the apparatus. The driving belt 474 extends in the front-rear direction.

The pulley 477 provided on the rear side of the apparatus is attached to both ends of a driving shaft 476. The Y-direction moving motor 48 (see FIG. 2) is connected to the driving shaft 476. When the Y-direction moving motor 48 is driven, the driving shaft 476 and the pulley 477 attached to the driving shaft 476 are rotated in forward and backward directions as necessary.

The rotation of the pulley 477 causes the driving belt 474 wound around the pulley 477 to rotate. With this, the X-direction moving stage 45 (and cartridge 7 mounted on the X-direction moving stage 45) is able to move in the Y-direction.

Moreover, a guide shaft 475 is provided on the supporter 471 extending in the front-rear direction parallel to the driving belt 474.

The X-direction moving stage 45 is formed in a rectangular box shape extending in a left-right direction (X-direction). The X-direction moving stage is provided in a rear end of the base upper plate 30.

The guide shaft 475 is inserted through each of the left and right ends of the X-direction moving stage 45. When the Y-direction moving motor 48 (see FIG. 2) is driven and the driving belt 474 rotates, the X-direction moving stage 45 is able to move in the Y-direction along the guide shaft A pulley which is not shown is provided on the inner side of the X-direction moving stage 45. A driving belt 454 extending in the left-right direction is wound around this pulley. A guide axis 455 extending in the left-right direction substantially parallel to the driving belt 454 is provided on the inner side of the X-direction moving stage 45.

A cartridge holder 8 that detachably holds the cartridge 7 is mounted on the X-direction moving stage 45.

A holder supporter (not shown) through which the guide shaft 455 is inserted is provided on the rear side (rear side in FIG. 1) of the cartridge holder 8.

When the X-direction moving motor 46 (see FIG. 2) is driven and the driving belt 454 rotates, the cartridge holder 8 is able to move in the X-direction moving stage 45 along the guide shaft 455 in the X-direction.

According to the present embodiment, a head moving mechanism 49 (see FIG. 2) that is able to move the cartridge 7 as the print head in the X-direction and the Y-direction includes the X-direction moving motor 46 and the Y-direction moving motor 48. The operation of the head moving mechanism 49 is controlled by a later-described control apparatus 80.

The cartridge 7 according to the present embodiment functions as the print head as described above.

The cartridge 7 is an inkjet type inkjet head that performs printing by spraying fine droplets of ink from an ink ejector at a bottom surface of the cartridge 7 to a printed surface of the printing target (nail). For example, the cartridge 7 is able to discharge ink in the colors yellow (Y), magenta (M), and cyan (C). The cartridge 7 according to the present embodiment is able to discharge white ink as base coat paint. In the inkjet printing, since the color of the base coat greatly influences the hue, it is possible to obtain beautiful colors if the white base coat is printed.

The cartridge 7 moves in a region higher than the base upper plate 30.

The rear right side of the base upper plate 30 is a home position An where the cartridge 7 (cartridge holder 8) stands-by when printing is not performed. A cap (not shown) that covers the bottom surface of the cartridge 7 and protects the ink discharging surface from drying is provided in the home position Ar1.

The left side of the rear of the base upper plate 30 is to be a maintenance region Ar2 where maintenance such as cleaning of the cartridge 7 is performed when printing is not performed. In the maintenance region Ar2, a purger 72 where a purging (spitting) process is performed, a wiper 73 which wipes the ink discharging surface and a scraper 74 that removes the ink attached to the wiping member of the wiper 73 are provided in the maintenance region Ar2.

The substantial center of the front side portion of the base upper plate 30 in the left-right direction is the region corresponding to the window 63 of the finger fixer 6. This is the printed region Ar3 where the cartridge 7 performs the printing operation during the printing.

Figure 2:
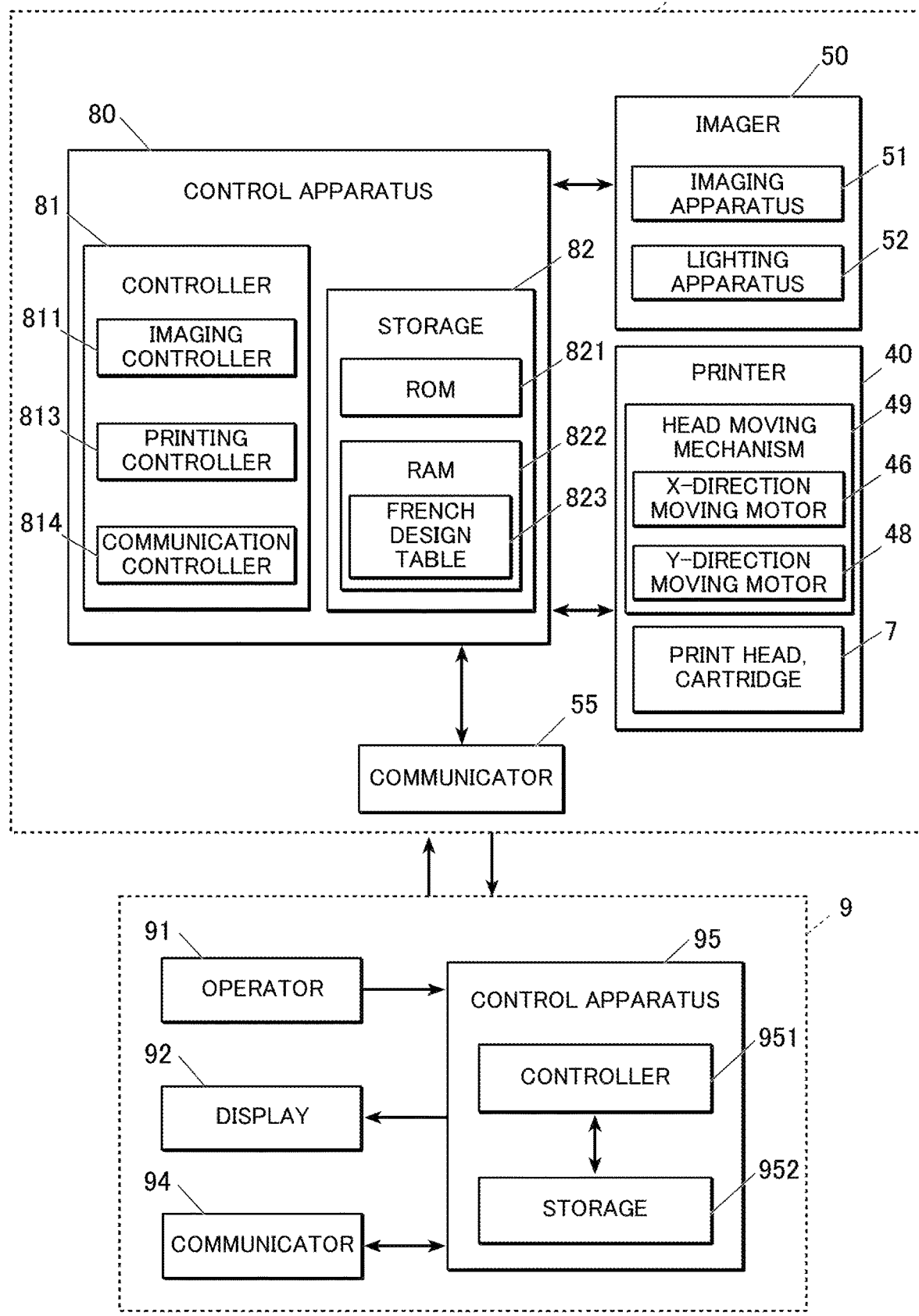
FIG. 2 is a control block diagram showing a schematic control configuration of the nail print apparatus and a terminal apparatus according to the present embodiment.

FIG. 2 is a control block diagram showing a schematic control configuration of the nail print apparatus 1 and a later-described terminal apparatus 9.

As shown in the diagram, the nail print apparatus 1 includes an imager 50, a communicator 55, and a control apparatus 80 in addition to the above-described printer 40.

The imager 50 includes an imaging apparatus 51 and a lighting apparatus 52.

The imager 50 is provided above the window 63 of the finger fixer 6. While the nail of the printed finger positioned in the finger fixer 6 is illuminated with the lighting apparatus 52, the printed finger is imaged with the imaging apparatus 51. With this, a nail image (image of the finger including the nail image) that is the image of the nail of the printed finger is obtained.

The imager 50 may be able to move in the XY direction by the head moving mechanism 49 that moves the cartridge 7.

The imaging apparatus 51 is a small camera including a lens and a solid state photographic device that is a CCD (Charge Coupled Device) type or a CMOS (Complementary Metal Oxide Semiconductor) type including 2 million or more pixels. The lighting apparatus 52 is an illuminating lamp such as a white LED.

The communicator 55 is able to transmit and receive information with the later-described terminal apparatus 9 that operates linked with the nail print apparatus 1.

For example, communication between the nail print apparatus 1 and the terminal apparatus 9 is performed by wireless LAN, etc. The communication between the nail print apparatus 1 and the terminal apparatus 9 is not limited to the above, and may be any method. For example, the communication may use network lines such as the Internet, or wireless communication based on short range wireless communication standards such as Bluetooth (registered trademark) or Wi-Fi. The communication is not limited to wireless communication and various data can be transmitted and received between the devices by wired connection. The communicator 55 includes an antenna chip corresponding to the communication method of the terminal apparatus 9.

The control apparatus 80 is a computer including a controller 81 that includes a CPU (Central Processing Unit, not shown), and a storage 82 that includes a ROM (Read Only Memory) 821, and a RAM (Random Access Memory) 822.

Various programs and various data to operate the nail print apparatus 1 are stored in the storage 82.

Specifically, various programs such as a printing program to perform the printing process is stored in the ROM 821 of the storage 82. Such programs are performed by the control apparatus 80 and the units of the nail print apparatus 1 are centrally controlled.

A French design table 823 is stored in the RAM 822 of the storage 82.

Figure 3:
FIG. 3 is a diagram showing an example of a French design table according to the present embodiment.
Figure 3:
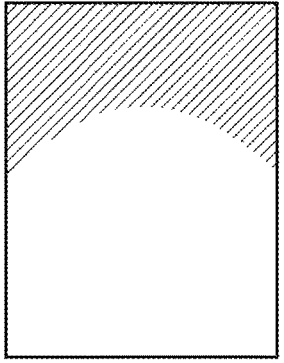
Figure 3:
Figure 3:
Figure 3:
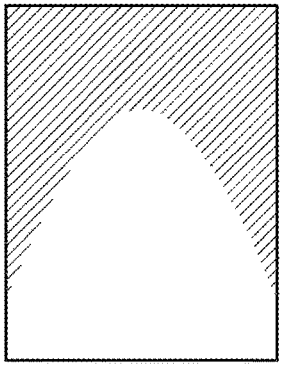
Figure 3:
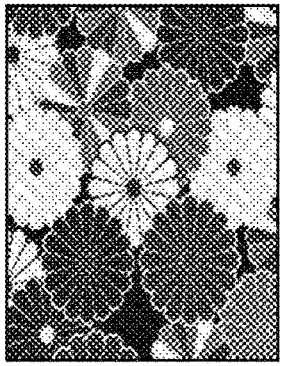
Figure 3:
Figure 3:
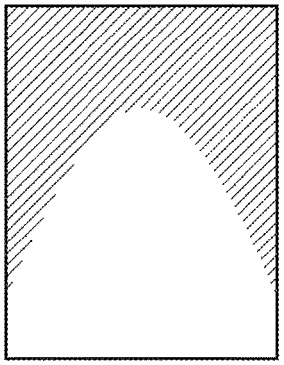
Figure 3:

As shown in FIG. 3, the French design table 823 is a table in which a French design (data) F, French shape data K, and design data (base design) D are stored corresponded to each other in advance to form a plurality of groups.

The French design F is image data of a French nail in which a printed region and a non-printed region are mixed. The French shape data K is the image data showing the printed region and the non-printed region of the corresponding French design F. The design data D is the image data of the design portion printed in the printed region of the corresponding French design F.

As shown in FIG. 2, the controller 81 includes the following functional units which are, an imaging controller 811, a printing controller 813, and a communication controller 814. The functions of each functional unit are realized by the CPU of the controller 81 in coordination with the program stored in the ROM 821 of the storage 82.

The imaging controller 811 controls the imaging apparatus 51 and the lighting apparatus 52 of the imager 50. The imaging controller 811 controls the imaging apparatus 51 and images the image of the finger (nail image) including the image of the nail of the printed finger fixed in the finger fixer 6.

The image data of the nail image obtained by the imager 50 is transmitted to the later-described terminal apparatus 9 through the communicator 55. The image data may be stored in the storage 82.

The printing controller 813 outputs the control signal to the printer 40 based on the printing data transmitted from the later-described terminal apparatus 9. The printing controller 813 controls the X-direction moving motor 46, the Y-direction moving motor 48, and cartridge 7 of the printer 40 so that printing is performed on the nail according to the printing data.

The communication controller 814 controls the operation of the communicator 55. According to the present embodiment, the communication controller 814 controls the communication with the later-described terminal apparatus 9, and receives the printing data, etc. when the printing data, etc. is transmitted from the terminal apparatus 9.

The nail print apparatus 1 according to the present embodiment is configured to be able to communicate with the terminal apparatus 9, and performs the printing operation based on operation instructions from the terminal apparatus 9.

The terminal apparatus 9 is a portable terminal such as a smartphone, tablet, and the like. The terminal apparatus 9 is not limited as long as communication with the nail print apparatus 1 is possible, and may be a laptop computer, a desktop computer, a gaming terminal apparatus, or the like.

Specifically, the terminal apparatus 9 includes, an operator 91, a display 92, a communicator 94, and a control apparatus 95.

Various input and setting can be performed according to the operation by the user on the operator 91. When the operator 91 is operated, the input signal corresponding to the operation is transmitted to the control apparatus 95. A touch panel is provided as one on a surface of the display 92 in the present embodiment, and the user is able to perform operation of various input and setting by touch operation on the touch panel.

The operator 91 in which operation of various input and setting is performed is not limited to a touch panel. For example, various operation buttons, a keyboard or a pointing device can be provided as the operator 91. According to the present embodiment, the user operates the operator 91 and the nail design that is printed on the nail can be selected.

The touch panel included in the display 92 displays various display screens according to the control of a later-described controller 951.

According to the present embodiment, the nail design input and selected by the user on the operator 91 and the image transmitted from the nail print apparatus 1 can be displayed on the display 92.

The communicator 94 is able to transmit printing data to the nail print apparatus 1. The communicator 94 receives the nail image data when the nail image data is transmitted from the nail print apparatus 1. The communicator 94 includes a wireless communication module that is able to communicate with the communicator 55 of the nail print apparatus 1.

The communicator 94 may be any device that is able to communicate with the nail print apparatus 1 and a device that matches with the communication standard of the communicator 55 of the nail print apparatus 1 is applied.

The control apparatus 95 is a computer including a controller 951 including a CPU (Central Processing Unit, not shown), and a storage 952 including a ROM (Read Only Memory, not shown), and a RAM (Random Access Memory, not shown).

Various programs and various data to operate units of the terminal apparatus 9 are stored in the storage 952.

Specifically, in the ROM of the present embodiment, in addition to the operation program to centrally control each unit of the terminal apparatus 9, various programs such as the nail print application program to perform the nail printing using the nail print apparatus 1 are stored. The control apparatus 95 deploys and executes these programs in the work space of the RAM, for example, and the terminal apparatus 9 is controlled.

The nail design data, the nail image, and the information of the nail shape are stored in the storage 952 of the present embodiment. The French design table 823 as described above may be stored in the storage 952 of the terminal apparatus 9.

The controller 951 integrally controls the operation of the units of the terminal apparatus 9. The controller 951 realizes various functions to perform the printing on the nail in coordination with the program stored in the storage 952.

Next, the operation of the nail print apparatus 1 when the printing is performed on the nail is described.

Figure 4:
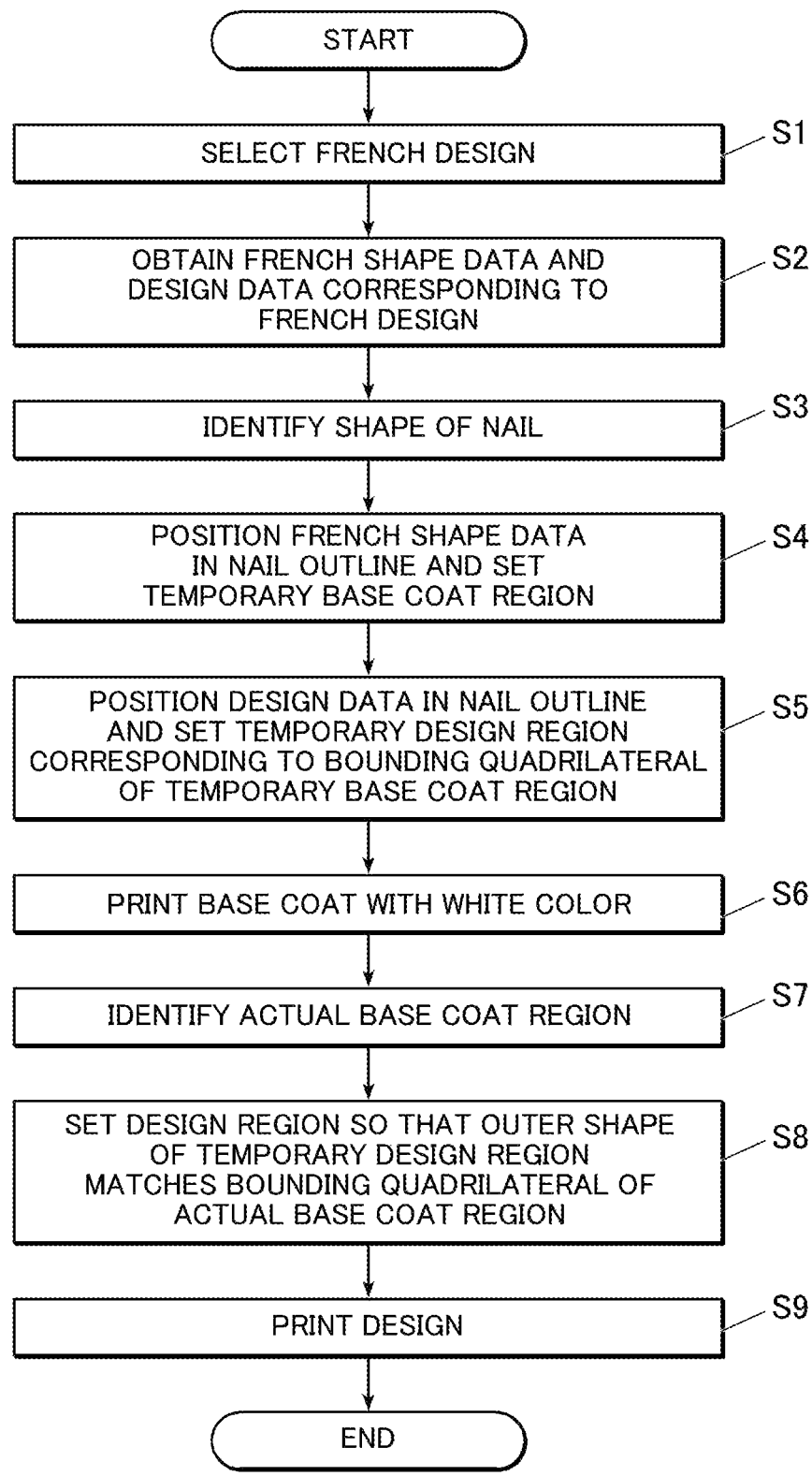
FIG. 4 is a flowchart showing a flow of a printing process according to the present embodiment.

FIG. 4 is a flowchart showing a flow of the printing process of the nail print apparatus 1, and FIG. 5A to FIG. 5E and FIG. 6A to FIG. 6D are diagrams describing the printing process.

In the printing process according to the present embodiment, printing of the French nail in which the printed region and the non-printed region are mixed is performed.

For ease of description, the control apparatus 80 (controller 81) of the nail print apparatus 1 is described as the main device that performs the process. However, the control of the operation of the entire system including the terminal apparatus 9 operated by the user is suitably performed in coordination with the control apparatus 95 (controller 951) of the terminal apparatus 9 through the communicator.

As shown in FIG. 4, when the printing process is performed, first, the controller 81 selects the French design based on user operation (step S1). The user selects the desired French design F from the French design list displayed on the display 92, for example.

According to the present embodiment, the French design F1 (first French design F) is selected, for example (see FIG. 3).

Next, the controller 81 reads the French design table 823 from the storage 82 and obtains the French shape data K and the design data D corresponding to the French design F selected in step S1 (step S2).

According to the present embodiment, the French shape data K1 and the design data D1 corresponding to the French design F1 are read out and obtained (see FIG. 3).

Next, the controller 81 controls the imaging controller 811 to image the nail to perform the printing and the shape of the nail is identified by the nail shape detector (step S3).

Here, the imaging controller 811 controls the imager 50 and images the nail of the printed finger exposed from the window 63 of the finger fixer 6. The controller 81 identifies the shape of the nail (nail outline) from the obtained nail image and displays the shape on the display 92. When the nail image (nail outline) obtained in advance or a standard nail outline is used, the above may be displayed.

Next, the controller 81 positions the French shape data K in the nail outline, sets a "temporary" base coat region where the white base coat paint is to be printed, and generates the base coat printing data (step S4). The base coat region set here may be different from the actual region as described below. Therefore, the region is called "temporary" that is the planned region at the present stage.

Here, the controller 81 displays the French shape data K obtained in step S2 on the display 92 displaying the nail outline in step S3, and performs positioning and fitting (enlarging and reducing) of the French shape data K and the nail outline by user operation (or automatically). Then, as the printed region of the French shape data K in the nail outline, the temporary base coat region A1 is set, and base coat printing data including coordinate information and ink color (white) information is generated.

Figure 5A:
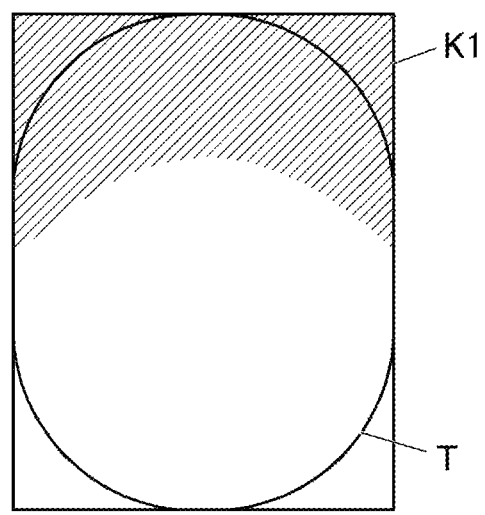
FIG. 5A is a diagram that describes a printing process according to the present embodiment.
Figure 5B:
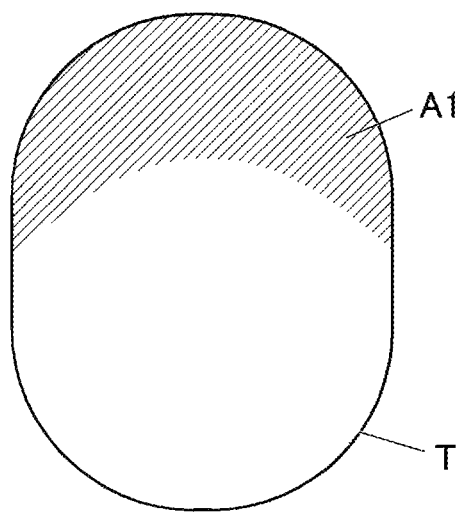
FIG. 5B is a diagram that describes the printing process according to the present embodiment.

According to the present embodiment, as shown in FIG. 5A, the French shape data K1 is fit in the nail outline T, and as shown in FIG. 5B, the temporary base coat region A1 (hatching portion) is set. Then, the base coat printing data including the coordinate information and the ink color (white) information is generated.

Next, the controller 81 positions the design data D in the nail outline in which the French shape data K is positioned, sets the "temporary" design region, and generates the "temporary" design printing data (step S5). Here, the setting and generating design region and the design printing data correspond to the temporary base coat region A1, and "temporary" is added.

Here, the controller 81 displays the design data D obtained in step S2 on the display 92 in which the nail outline and the French shape data K are displayed. The controller 81 performs positioning and fitting (enlarging and reducing) of the design data D with the nail outline and the French shape data K by user operation (or automatically). Then, the temporary design region corresponding to the temporary base coat region A1 set by fitting the French shape data K in the nail outline in step S4 is set. Here, the temporary design region is not set in the shape (outer shape) of the temporary base coat region A1 and is set as the region of the outer shape of a quadrilateral corresponding to the bounding quadrilateral of the temporary base coat region A1. The bounding quadrilateral is not limited and includes sides along the X-direction or the Y-direction.

Figure 5C:
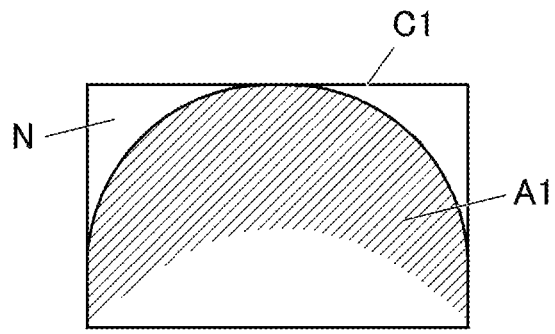
FIG. 5C is a diagram that describes a printing process according to the present embodiment.
Figure 5D:
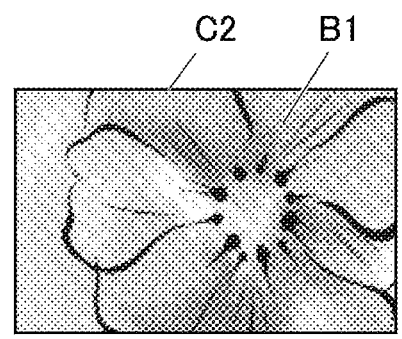
FIG. 5D is a diagram that describes the printing process according to the present embodiment.

According to the present embodiment, as shown in FIG. 5C and FIG. 5D, the temporary design region B1 is set including the outer shape C2 of the quadrilateral with the shape and size corresponding to the bounding quadrilateral C1 of the temporary base coat region A1 (hatching portion) formed by fitting the French shape data K1 in the nail outline T. Then, the temporary design printing data including the coordinate information and the ink color information is generated.

Next, the controller 81 prints the white color which is to be the base coat based on the base coat printing data generated in step S4 (step S6).

Figure 5E:
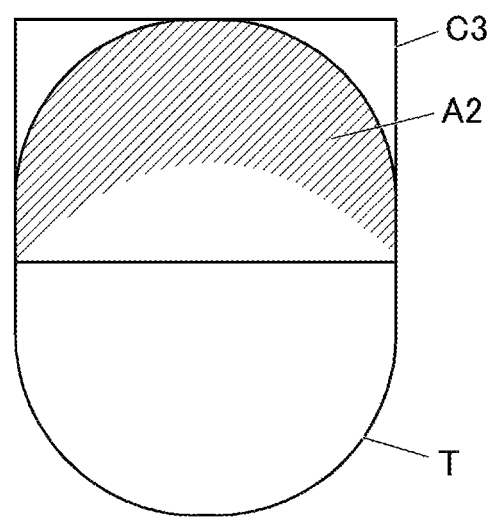
FIG. 5E is a diagram that describes the printing process according to the present embodiment.

Then, the controller 81 functions as the base coat region detector. The controller 81 controls the imaging controller 811 and images the printed nail. Then, the actual base coat region A2 (hatching portion) in which the white color is printed on the nail T and which is shown in FIG. 5E is identified (step S7). This step is for confirming the position of the base coat region A2, and if the printed finger is not moved after printing the white color in step S6, this step is not necessary. However, after the white color is printed in step S6, it may be necessary to dry the white ink or to apply the receptive layer for the color ink on the white ink. Then, there is a possibility that a shift in the position of the nail may occur due to the printed finger being pulled out and inserted again. By imaging the nail again in step S7, it is possible to check the position of the actual base coat region A2.

Next, the controller 81 adjusts the temporary design printing data generated in step S5 by matching the outer shape of the temporary design region B1 to the outer shape of the bounding quadrilateral C3 of the actual base coat region A2 identified in step S7 and shown in FIG. 5E. Then, the design region is set and the design printing data is generated (step S8).

In this step, the actual base coat region A2 is detected from the nail image, at least one of the position, tilt and size (trimming region) of the temporary design region B2 is adjusted to match the external shape of the temporary design region to the bounding quadrilateral of the base coat region A2, and the portion overlapping with the base coat region A2 in the adjusted temporary design region B1 is set as the design region. Then, the design printing data including the coordinate information and the ink color information of the design region is generated.

Figure 6A:
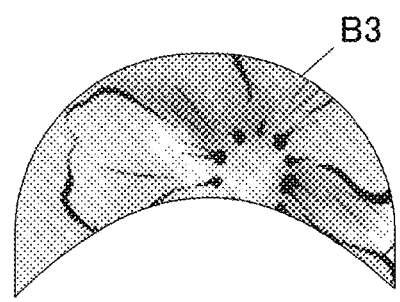
FIG. 6A is a diagram that describes the printing process according to the present embodiment.
Figure 6B:
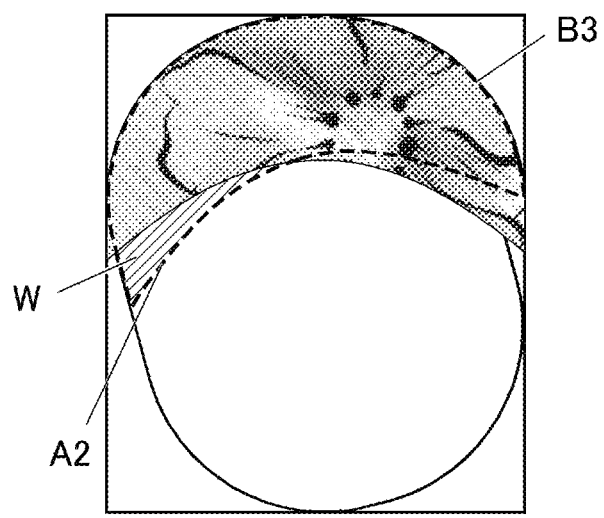
FIG. 6B is a diagram that describes the printing process according to the present embodiment.

Here, as shown in FIG. 6A, if the design region B3 corresponding to the shape of the temporary base coat region A1 is generated in advance and the actual base coat region A2 is matched to the above, as shown in FIG. 6B, the actual base coat region A2 (portion surrounded by broken line) tends to be shifted from the design region B3 if the printed finger moves. The slight shift causes the base coat to come out from the border (base coat overflow W, hatching portion).

Figure 6C:
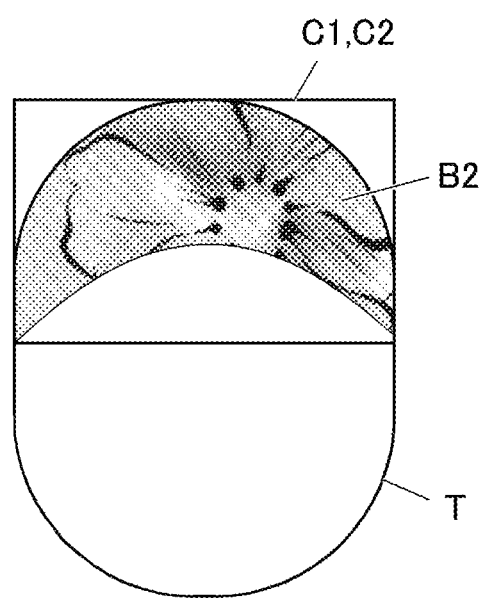
FIG. 6C is a diagram that describes the printing process according to the present embodiment.

According to the present embodiment, the temporary design region B1 of the outer shape C2 corresponding to the bounding quadrilateral C1 of the temporary base coat region A1 is generated in advance. As shown in FIG. 6C, the design region B2 is set by matching the outer shape C2 of the temporary design region B1 to the bounding quadrilateral C1 of the actual base coat region A2. That is, the portion corresponding to the non-printed region N (see FIG. 5C) other than the temporary base coat region A1 in the bounding quadrilateral C1 of the temporary base coat region A1 is included in the temporary design region B1 in advance as the margin for the shift in the positions. Therefore, even if the actual base coat region A2 is slightly shifted from the temporary design region B1 when the design region B2 is set, the base coat overflow W from the design region B2 can be suppressed to a small amount.

Figure 6D:
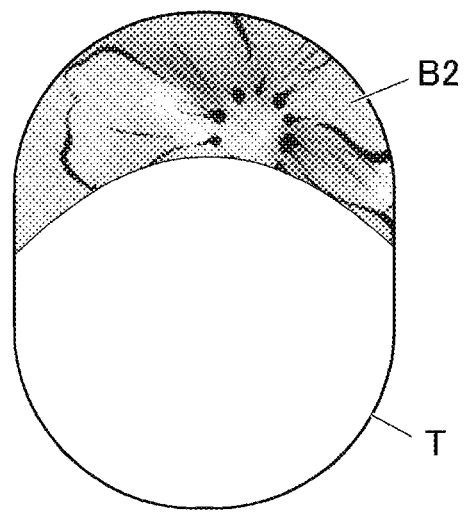
FIG. 6D is a diagram that describes the printing process according to the present embodiment.

Then, based on the design printing data generated in step S8, the controller 81 performs design printing (step S9). With this, as shown in FIG. 6D, the desired French design F can be printed.

Then, after the design printing is complete, the controller 81 ends the printing process.

As described above, according to the present embodiment, the temporary design region B1 including the outer shape C2 corresponding to the bounding quadrilateral C1 of the temporary base coat region A1 where the base coat is to be applied is set, the temporary design region B1 is adjusted to match the outer shape C2 to the bounding quadrilateral C1 of the actual base coat region A2, and the portion of the adjusted temporary design region B1 overlapping with the actual base coat region A2 is set as the design region B2.

That is, the portion corresponding to the non-printed region N other than the temporary base coat region A1 in the bounding quadrilateral C1 of the temporary base coat region A1 is included in the temporary design region B1 in advance as the margin for displacement of the positions. Therefore, even if the actual base coat region A2 is slightly shifted from the temporary design region B1 when the design region B2 is set, the base coat overflow W from the design region B2 can be suppressed to a small amount. Therefore, the decrease of the printing quality can be suppressed.

According to the present embodiment, the French design table 823 is stored in advance in the storage 82. In the French design table 823, the French design F, the French shape data K, and the design data D are corresponded to each other. Then, the French shape data K corresponding to the desired French design F is read out from the storage 82, and the temporary base coat region A1 is set based on the French shape data K. The design data D corresponding to the desired French design F is read out from the storage 82, and the temporary design printing data is generated based on the design data D.

With this, the user simply selects the desired French design F, and the setting of the temporary base coat region A1 and the generating of the temporary design printing data can be performed easily.

The embodiments of the present invention are described above, but the present invention is not limited to the above-described embodiments, and various modifications are possible without leaving the scope of the present invention.

For example, according to the present embodiment, the temporary design region B1 with the outer shape corresponding to the bounding quadrilateral of the temporary base coat region A1 in step S5 may be set and the design region may be set to match the outer shape of the temporary design region B1 to the bounding quadrilateral of the actual base coat region A2 in step S8. However, the bounding quadrilateral used in these steps may be any bounding polygon.

The base coat may be a color other than white and may be hand painted instead of printed.

The printing apparatus according to the present invention is not limited to an apparatus that prints French nails.

According to the present embodiment, the nail print apparatus 1 performs printing by the inkjet method. However, the method that the nail print apparatus 1 performs printing is not limited to the inkjet method.

For example, the apparatus may include a pen holder that holds a pen for printing that performs printing by placing a pen tip in contact with a surface of a nail. The printing is performed using the pen. Moreover, the apparatus may include both the inkjet type printer according to the present embodiment and the pen holder that holds the pen for printing. The apparatus may perform printing using a plurality of printing units.

According to the present embodiment, the nail print apparatus 1 is linked with the terminal apparatus 9 and forms the printing system. The input of the printing start instruction is performed on the terminal apparatus 9 and the printing operation is performed on the nail print apparatus 1. However, the nail print apparatus 1 is not limited to the apparatus shown here.

For example, the operator and display in which various instructions are input and a printing data generator that generates the printing data may be provided in the nail print apparatus 1. The control apparatus of the nail print apparatus 1 may perform the above processes. According to the above configuration, the nail print apparatus 1 can complete the printing operation by itself without being linked to the terminal apparatus.

Various data such as the nail design, the imaged image data, and printing tilt setting table may be stored in the storage of the terminal apparatus or may be stored in the storage of the nail print apparatus 1.

Various data may be stored in a server apparatus that can be connected through a network line or the like, and the terminal apparatus or the nail print apparatus 1 may be able to access to such server apparatus and refer to the data.

According to the above configuration, it is possible to select a design to be printed from a larger number of nail designs.

Various embodiments of the present invention are described. However, the scope of the present invention is not limited to the above embodiments, and the scope of the present invention includes the scope as claimed and its equivalents.

The invention as described in the claims originally attached to the application is appended below. The claim numbers described in the attached note are the same as the claims originally attached to the application.

INDUSTRIAL APPLICABILITY

As described above, the printing apparatus, the control method of the printing apparatus, and the control program according to the present invention are useful to suppress the decrease in the printing quality.

REFERENCE SIGNS LIST 1 nail print apparatus
40 printer
50 imager
81 controller
82 storage
823 French design table
A1 temporary base coat region
A2 base coat region
B1 temporary design region
B2 design region
D design data
F French design
K French shape data
N non-printed region
C bounding quadrilateral
T nail outline

The invention claimed is:

1. A printing apparatus comprising:
a hardware processor configured to:
set a temporary base coat region which is a region where a base coat is to be applied,
set a temporary design region which is a base design region and which includes an outer shape corresponding to a bounding polygon of the temporary base coat region,
detect a base coat region of a nail where the base coat is applied,
adjust the temporary design region so that an outer shape of the temporary design region matches an outer shape of a bounding polygon of the base coat region,
set a portion of the adjusted temporary design region overlapping with the base coat region as a design region, and
generate design printing data; and
a printer that prints a design on the nail based on the design printing data.

2. The printing apparatus according to claim 1, wherein the hardware processor is configured to detect a shape of the nail, set the temporary base coat region as a printed region with the detected shape of the nail, and generate base coat printing data, and
wherein the printer prints the base coat on the nail based on the base coat printing data.

3. The printing apparatus according to claim 2, further comprising a storage that stores in advance French design data that is image data of a French nail including a printed region and a non-printed region corresponded with French shape data that shows the printed region and the non-printed region, and
wherein the hardware processor is configured to read from the storage the French shape data corresponding to desired French design data, position the read French shape data in the detected shape of the nail, and set the temporary base coat region as the printed region in the shape of the nail.

4. The printing apparatus according to claim 3, wherein the storage stores in advance the French design data and the French shape data corresponded with the base design printed in the printed region, and
wherein the hardware processor is configured to read from the storage the French shape data and the base design corresponded with the desired French design data, position the base design read in the detected shape of the nail, and generate the temporary design printing data.

5. The printing apparatus according to claim 1, wherein the bounding polygon is a bounding quadrilateral.

6. The printing apparatus according to claim 1, wherein the hardware processor is configured to adjust at least one of a position of the temporary design region, a tilt of the temporary design region, and a size of the temporary design region so as to match the outer shape of the temporary design region to the bounding polygon of the base coat region.

7. A method performed by a controller of a printing apparatus, the method comprising:
setting a temporary base coat region which is a region where a base coat is to be applied;
setting a temporary design region which is a base design region and which includes an outer shape corresponding to a bounding polygon of the temporary base coat region;
detecting a base coat region of a nail where the base coat is applied;
adjusting the temporary design region so that an outer shape of the temporary design region matches an outer shape of a bounding polygon of the base coat region; and
setting a portion of the adjusted temporary design region overlapping with the base coat region as a design region.

8. A non-transitory computer-readable storage medium having a program stored thereon that is executable by a computer to perform functions comprising:
setting a temporary base coat region which is a region where a base coat is to be applied;
setting a temporary design region which is a base design region and which includes an outer shape corresponding to a bounding polygon of the temporary base coat region;
detecting a base coat region of a nail where the base coat is applied;
adjusting the temporary design region so that an outer shape of the temporary design region matches an outer shape of a bounding polygon of the base coat region; and
setting a portion of the adjusted temporary design region overlapping with the base coat region as a design region.

* * * * *